US012658601B2

(12) United States Patent
So et al.

(10) Patent No.: US 12,658,601 B2
(45) Date of Patent: Jun. 16, 2026

(54) DUAL POLARIZATION ANTENNA AND DUAL POLARIZATION ANTENNA ASSEMBLY COMPRISING SAME

(71) Applicant: KMW INC., Hwaseong-si (KR)

(72) Inventors: Sung Hwan So, Hwaseong-si (KR); Oh Seog Choi, Hwaseong-si (KR); Seong Man Kang, Hwaseong-si (KR); Yong Won Seo, Hwaseong-si (KR); Myung Hwa Kim, Hwaseong-si (KR); Su Yong Lee, Seoul (KR)

(73) Assignee: KMW INC., Hwaseong-si (KR)

( * ) Notice: Subject to any disclaimer, the term of this patent is extended or adjusted under 35 U.S.C. 154(b) by 158 days.

(21) Appl. No.: 18/540,910

(22) Filed: Dec. 15, 2023

(65) Prior Publication Data

US 2024/0145939 A1 May 2, 2024

Related U.S. Application Data

(63) Continuation of application No. PCT/KR2022/008201, filed on Jun. 10, 2022.

(30) Foreign Application Priority Data

Jun. 16, 2021 (KR) ........................ 10-2021-0078330

(51) Int. Cl.
*H01Q 21/24* (2006.01)
*H01Q 21/00* (2006.01)
*H01Q 1/42* (2006.01)

(52) U.S. Cl.
CPC ......... *H01Q 21/24* (2013.01); *H01Q 21/0087* (2013.01); *H01Q 1/42* (2013.01)

(58) Field of Classification Search
CPC ...... H01Q 21/24; H01Q 21/0087; H01Q 1/42; H01Q 9/045; H01Q 1/38; H01Q 1/46
See application file for complete search history.

(56) References Cited

U.S. PATENT DOCUMENTS 5,047,788 A * 9/1991 Gillard ................. H01Q 15/147 343/915
5,086,304 A * 2/1992 Collins ................ H01Q 21/064 343/778

(Continued)

FOREIGN PATENT DOCUMENTS

CN 107528115 A 12/2017
CN 110416688 B 3/2021

(Continued)

OTHER PUBLICATIONS

International Search Report mailed Oct. 6, 2022 for International Application No. PCT/KR2022/008201 and its English translation.

(Continued)

*Primary Examiner* — Dameon E Levi
*Assistant Examiner* — Jordan E. DeWitt

(57) ABSTRACT

A dual polarization antenna is disclosed in at least one embodiment of the present disclosure, including a base substrate, a power feeding unit supported on the base substrate, and a radiating plate supported on the power feeding unit, the power feeding unit includes a first feeding substrate and a second feeding substrate arranged to cross each other on the base substrate, the first feeding substrate includes a first feed line configured to supply a first reference phase signal to a first point on the radiating plate and to supply a first reverse phase signal having a reverse phase relative to the first reference phase signal, to a second point on the radiating plate, the second feeding substrate includes a second feed line configured to supply a second reference phase signal to a third point on the radiating plate and to supply a second reverse phase signal having a reverse phase relative to the second reference phase signal, to a fourth point on the radiating plate, and wherein the first feeding substrate and the first feed line as well as the second feeding (Continued)

substrate and the second feed line are integrally molded by means of multi-component injection molding.

13 Claims, 7 Drawing Sheets

(56) References Cited

U.S. PATENT DOCUMENTS

| | | | | |
|---|---|---|---|---|
| 5,497,165 | A * | 3/1996 | Murakami | H01Q 9/0442 343/846 |
| 6,110,576 | A * | 8/2000 | Decker | B32B 27/18 428/300.1 |
| 7,057,558 | B2 * | 6/2006 | Fukushima | H01Q 1/38 343/700 MS |
| 7,427,966 | B2 * | 9/2008 | Boss | H01Q 21/26 343/810 |
| 11,038,273 | B1 * | 6/2021 | Cai | H01Q 1/521 |
| 11,177,582 | B2 * | 11/2021 | Seo | H01Q 9/0457 |
| 2002/0101388 | A1 * | 8/2002 | Ippolito | H01Q 21/08 343/797 |
| 2003/0116886 | A1 * | 6/2003 | Nakazawa | B29C 45/062 264/255 |
| 2005/0146471 | A1 | 7/2005 | Kwon et al. | |
| 2005/0156802 | A1 * | 7/2005 | Livingston | H01Q 13/10 343/770 |
| 2005/0244611 | A1 * | 11/2005 | Deininger | A61N 1/37512 428/137 |
| 2007/0146225 | A1 * | 6/2007 | Boss | H01Q 21/08 343/797 |
| 2007/0188986 | A1 * | 8/2007 | Kobayashi | G09F 13/22 361/679.21 |
| 2010/0073337 | A1 * | 3/2010 | Tsubata | G09G 3/3655 345/204 |
| 2014/0049439 | A1 * | 2/2014 | Ho | H01Q 5/364 343/858 |
| 2014/0118212 | A1 * | 5/2014 | Lee | H01Q 1/246 343/795 |
| 2014/0125539 | A1 * | 5/2014 | Katipally | H01Q 21/26 343/794 |
| 2015/0130682 | A1 * | 5/2015 | Jung | H01Q 1/525 343/895 |
| 2016/0049718 | A1 | 2/2016 | Mueller et al. | |
| 2017/0054205 | A1 * | 2/2017 | Feldman | H01Q 21/0075 |
| 2017/0085009 | A1 * | 3/2017 | Watson | H01Q 21/26 |
| 2017/0244159 | A1 * | 8/2017 | Moon | H01Q 5/42 |
| 2017/0294704 | A1 * | 10/2017 | Sun | H01Q 15/14 |
| 2022/0077593 | A1 * | 3/2022 | Lee | H01Q 25/001 |
| 2023/0046767 | A1 * | 2/2023 | Shu | H01Q 5/307 |
| 2024/0145939 | A1 * | 5/2024 | So | H01Q 9/045 |
| 2025/0046999 | A1 * | 2/2025 | Xue | H01Q 9/0442 |

FOREIGN PATENT DOCUMENTS

| | | | |
|---|---|---|---|
| EP | 3731345 | A1 | 10/2020 |
| JP | 2013-197678 | A | 9/2013 |
| JP | 2021-506201 | A | 2/2021 |
| KR | 10-2005-0055551 | A | 6/2005 |
| KR | 10-0959823 | B1 | 5/2010 |
| KR | 10-2014-0094785 | A | 7/2014 |
| KR | 10-2014-0103789 | A | 8/2014 |
| KR | 10-2018-0046116 | A | 5/2018 |
| KR | 10-2019-0074064 | A | 6/2019 |
| KR | 10-2020-0132618 | A | 11/2020 |
| WO | 2019/124844 | A1 | 6/2019 |

OTHER PUBLICATIONS

Non-final Office Action mailed on Oct. 29, 2024 from the Japanese Patent Office for Japanese Application No. 2023-571930 and its English translation.

Office Action mailed on Jul. 23, 2025 from Korean Patent Office for Application No. 10-2021-0078330 and its English translation.

European Search Report dated Apr. 29, 2025 from European Patent Office for Application No. 22825233.4.

* cited by examiner

DUAL POLARIZATION ANTENNA AND DUAL POLARIZATION ANTENNA ASSEMBLY COMPRISING SAME

CROSS-REFERENCE TO RELATED APPLICATIONS

This application is a continuation application of International Application No. PCT/KR2022/008201, filed Jun. 10, 2022, which claims the benefit of Korean Patent Application No. 10-2021-0078330 filed Jun. 16, 2021, in the Korean Intellectual Property Office, the disclosures of which are incorporated herein in their entirety by reference.

TECHNICAL FIELD

The present disclosure relates to a dual polarization antenna and dual polarization antenna assembly comprising the same.

BACKGROUND

Massive multiple-input multiple-output (MIMO) technology is a spatial multiplexing technique for dramatically enhancing the data transmission capacity by using a plurality of antennas, in which a transmitter transmits different data via the respective transmitting antennas and a receiver detects the transmitted different data one by one through appropriate signal processing. Therefore, the greater the number of the transmit antennas and the receive antennas in tandem, the greater channel capacity is obtained to allow more data to be transmitted. For example, increasing the number of antennas to 10 provides approximately 10 times the channel capacity of current single antenna systems by using the same frequency band.

As massive MIMO technologies require multiple antennas, the importance of reducing the space occupied by a single antenna module, i.e., reducing the size of individual antennas, is further emphasized. A dual polarization antenna is a technology that transmits and receives two electromagnetic wave signals that are perpendicular to each other with a single antenna element, and is considered to be advantageous for miniaturizing antenna structures.

DISCLOSURE

Technical Problem

Accordingly, a challenge that the present disclosure seeks to address is to provide a dual polarization antenna that is advantageous for antenna miniaturization.

The present disclosure further seeks to provide a dual polarization antenna that can improve inter-polarization isolation and cross-polarization discrimination while reducing the number of process connections and complexity of signal wiring for the betterment of the manufacturing process.

Another challenge that the present disclosure to address is to provide an antenna element that has increased structural stability and is relatively easy to mass produce.

It will be apparent to those skilled in the art from the following description that the subject matter to which the present disclosure is directed is not limited to the challenges set forth above but encompasses other unmentioned technical tasks to be addressed.

SUMMARY

At least one embodiment of the present disclosure provides a dual polarization antenna including a base substrate, a power feeding unit supported on the base substrate, and a radiating plate supported on the power feeding unit, wherein the power feeding unit includes a first feeding substrate and a second feeding substrate arranged to cross each other on the base substrate, the first feeding substrate includes a first feed line configured to supply a first reference phase signal to a first point on the radiating plate and to supply a first reverse phase signal having a reverse phase relative to the first reference phase signal, to a second point on the radiating plate, the second feeding substrate includes a second feed line configured to supply a second reference phase signal to a third point on the radiating plate and to supply a second reverse phase signal having a reverse phase relative to the second reference phase signal, to a fourth point on the radiating plate, and wherein the first feeding substrate and the first feed line as well as the second feeding substrate and the second feed line are integrally molded by means of multi-component injection molding.

The first feeding substrate, the first feed line, the second feeding substrate, and the second feed line may be integrally molded via multi-component injection molding The power feeding unit may have a "+" or cross shape.

At least one of the first feeding substrate and the second feeding substrate may include at least one or more reinforcing ribs that extend across the surface of the first feed line or the second feed line to secure the first feed line or the second feed line.

The first feeding substrate and the second feeding substrate may be vertically upright on the base substrate, and the first feeding substrate and the second feeding substrate may have respective midsections that intersect perpendicular to each other.

The first feeding substrate may be disposed parallel to a straight line connecting the first point and the second point, and the second feeding substrate may be disposed parallel to a straight line connecting the third point and the fourth point.

The radiating plate may be square, the first point, the second point, the third point, and the fourth point may be adjacent to four vertices of the radiating plate, and the radiating plate may have a diagonal length that is equal to a half wavelength of a center frequency of a frequency in use.

The first feed line may be connected to a signal line of the base substrate through one solder joint, and the second feed line may be connected to another signal line of the base substrate through another solder joint.

According to another embodiment, the present disclosure provides a dual polarization antenna assembly including a casing, one or more of the dual polarization antenna according to claim 1 disposed on the casing, and a radome configured to cover one or more of the dual polarization antenna.

Other specific details of the present disclosure are contained in the detailed description and drawings.

Advantageous Effects

The dual polarization antenna according to the present disclosure has the effect of reducing the overall component size.

The dual polarization antenna according to the present disclosure can improve inter-polarization isolation and cross-polarization discrimination while reducing the number of process connections and complexity of signal wiring for the betterment of the manufacturing process.

The dual polarization antenna according to the present disclosure has improved structural stability and is easy to mass produce.

Figure 1:
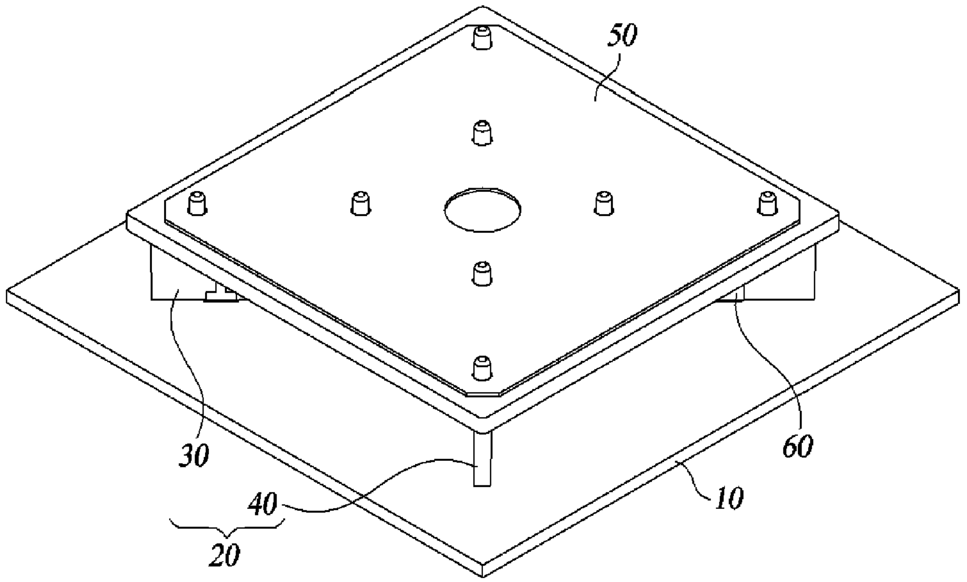
FIG. 1 is a schematic perspective view of a dual polarization antenna according to at least one embodiment of the present disclosure.

| REFERENCE NUMERALS | |
|---|---|
| 1: dual polarization antenna | 10: base substrate |
| 20: power feeding unit | 30: first feeding substrate |
| 40: second feeding substrate | 50: radiating plate |

DETAILED DESCRIPTION

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Embodiments of the present disclosure will be described in detail below with reference to the accompanying drawings.

FIG. 1 is a schematic perspective view of a dual polarization antenna according to at least one embodiment of the present disclosure.

Figure 2:
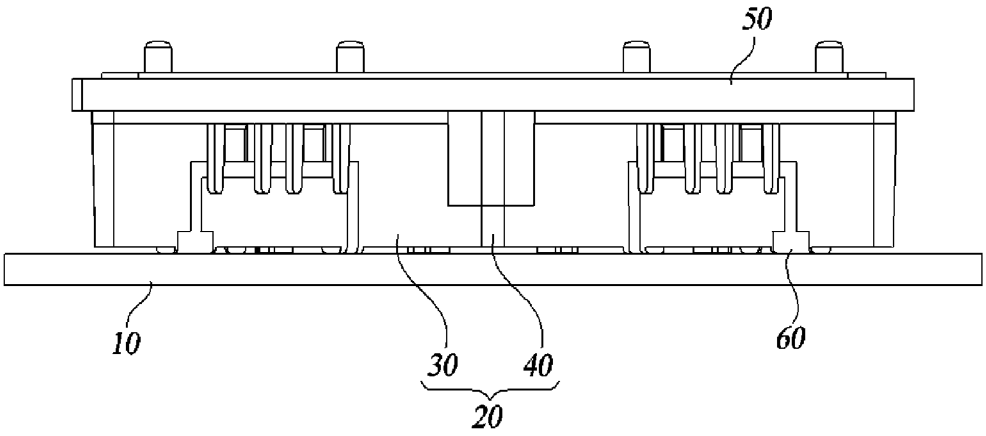
FIG. 2 is a cross-sectional view of the dual polarization antenna taken along line II-II' of FIG. 1.

FIG. 2 is a cross-sectional view of the dual polarization antenna taken along line II-II' of FIG. 1.

Figure 3:
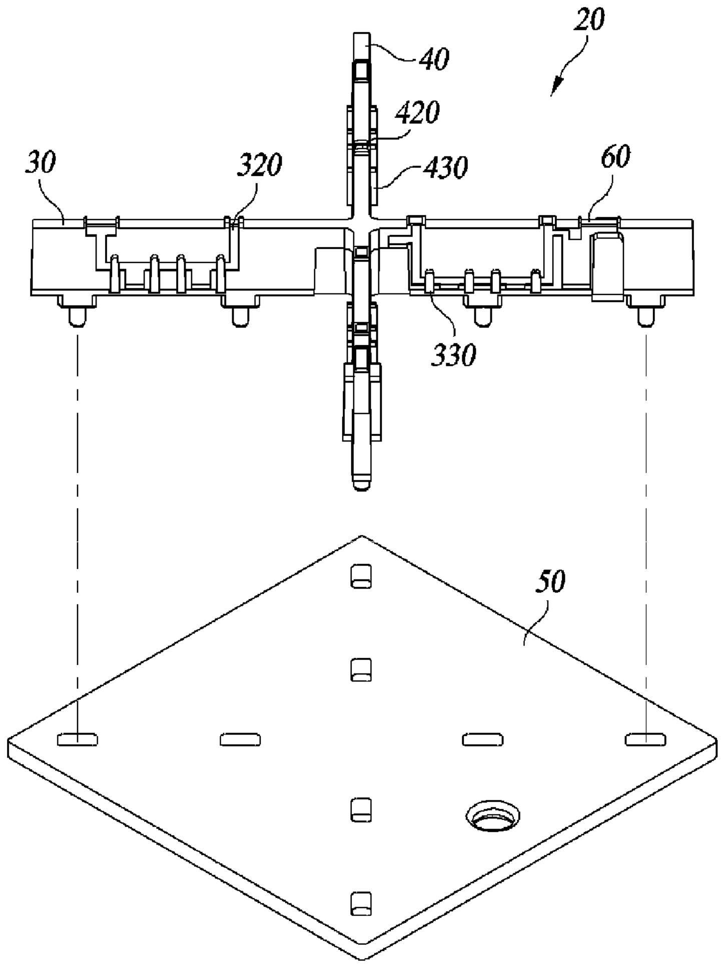
FIG. 3 is an exploded sectional view of the dual polarization antenna along the line II-II' of FIG. 1.

FIG. 3 is an exploded sectional view of the dual polarization antenna along the line II-II' of FIG. 1.

Figure 4:
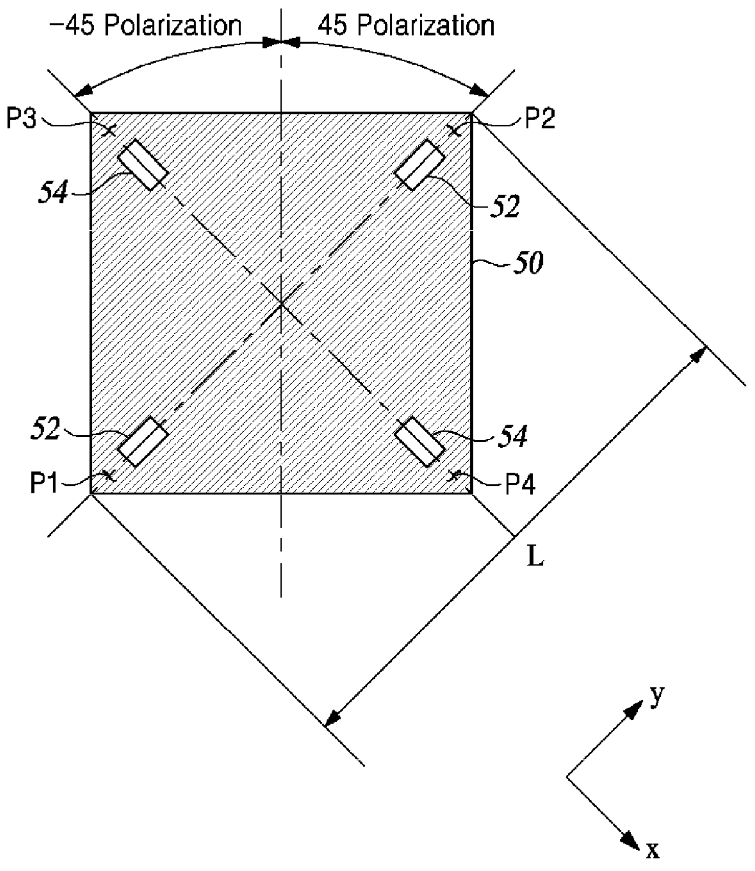
FIG. 4 is a top view of a dual polarization antenna according to at least one embodiment of the present disclosure.

FIG. 4 is a top view of a dual polarization antenna according to at least one embodiment of the present disclosure.

Referring to FIGS. 1 to 4, a dual polarization antenna 1 according to at least one embodiment of the present disclosure may include a base substrate 10, a power feeding unit 20, and a radiating plate 50.

The base substrate 10 may be a plate-like member made of plastic or metal. The base substrate 10 may include a ground layer. The ground layer of the base substrate 10 may provide a ground for the dual polarization antenna, while also acting as a reflective surface for radio signals emitted from the radiating plate 50. Thereby, the radio signal radiated from the radiating plate 50 toward the base substrate 10 may be reflected in the main radiation direction. Accordingly, the front-to-back ratio and gain of the dual polarization antenna according to at least one embodiment of the present disclosure can be improved.

The power feeding unit 20 is supported on the base substrate 10 and is configured to supply a high-frequency electrical signal to the radiating plate 50. The power feeding unit 20 may include a first feeding substrate 30 and a second feeding substrate 40 arranged to cross each other on the base substrate 10.

In at least one embodiment of the present disclosure, the first feeding substrate 30 and the second feeding substrate 40 are disposed vertically upright on the base substrate 10, and the first feeding substrate 30 and the second feeding substrate 40 may cross each other perpendicular to each other in their respective center regions.

Furthermore, in at least one embodiment of the present disclosure, the first feeding substrate 30 and the second feeding substrate 40 are illustrated as integrally molded, i.e., the power feeding unit 20 that is composed of the first feeding substrate 30 and the second feeding substrate 40 may have an appearance of a one-piece support having a "+" or cross shape.

However, the present disclosure is not limited to this configuration. In a variant embodiment of the present disclosure, the power feeding unit 20 may be composed of three or more feeding substrates, and the three or more feeding substrates may be supported on the base substrate 10 by intersecting each other in various ways with structural symmetry.

Additionally, the feeding substrates of the power feeding unit 20 may be integrally molded or may be individually manufactured and assembled.

The first feeding substrate 30 may include a first feed line 320. The second feeding substrate 40 may include a second feed line 420.

In at least one embodiment of the present disclosure, the first feed line 320 and the second feed line 420 may be integrally molded with the first feeding substrate 30 and the second feeding substrate 40. For example, the first feeding substrate 30 and the second feeding substrate 40 may be simultaneously and multi-component injection molded with the first feed line 320 and the second feed line 420 disposed inside a molding frame, thereby forming an integral "+" or cross shaped power feeding unit 20.

The first feed line 320 and the second feed line 420 may each supply a high-frequency electrical signal to the radiating plate 50. In the illustrated embodiment, the first feed line 320 and the second feed line 420 are each illustrated as being electrically capacitively coupled to the radiating plate 50 a short distance apart. However, the present disclosure is not so limited, and in other embodiments, the first feed line 320 and the second feed line 420 may each be in direct electrical contact with the radiating plate 50.

The first feeding substrate 30 may include one or more first substrate coupling protrusions formed on one long side thereof. The second feeding substrate 40 may include one or more second substrate coupling protrusions formed at one end thereof.

Correspondingly, the base substrate 10 may include first substrate-side coupling groove into which the first substrate coupling protrusions of the first feeding substrate 30 are inserted and second substrate-side coupling grooves into which the second substrate coupling protrusions of the second feeding substrate 40 are inserted.

In other embodiments of the present disclosure, the number of substrate coupling protrusions and coupling grooves may optionally be varied, and further, the first feeding substrate 30 and the second feeding substrate 40 may be fastened to the base substrate 10 by adhesion or separate coupling members other than by insertion fastening.

In at least one embodiment of the present disclosure, the first feeding board 30 and the second feeding board 40 may have substantially the same structure and electrical properties. For example, the length, width, and thickness of the first feeding board 30 and the second feeding board 40 may be substantially the same but differ only by the respective structural features for allowing the first feeding board 30 and the second feeding board 40 to intersect each other, for example, the direction and structure of the coupling slits and some of the geometry of the feed lines thereon.

The radiating plate 50 is supported on the power feeding unit 20, i.e., on the first feed plate 30 and the second feed plate 40. In other words, the radiating plate 50 is supported on the "+" or cross shaped power feeding unit 20. In at least one embodiment of the present disclosure, the radiating plate 50 may include a metal layer attached to a surface thereof. The radiating plate 50 may be disposed parallel to the base substrate 10 and perpendicular to the first feeding substrate 30 and the second feeding substrate 40.

In at least one embodiment of the present disclosure, the radiating plate 50 is illustrated as having a rectangular shape, with the first feeding substrate 30 and the second feeding substrate 40 each disposed across a diagonal direction of the radiating plate 50. However, the present disclosure is not limited to this configuration. The shape of the radiating plate 50 may be polygonal, circular, or annular.

The radiating plate 50 may include one or more first radiating plate-side coupling grooves and one or more second radiating plate-side coupling grooves. Correspondingly, the first feeding board 30 may have its opposing long side formed with one or more first radiating-plate coupling protrusions, and the second feeding board 40 may have its opposing long side formed with one or more second radiating-plate coupling protrusions.

The first radiating-plate coupling protrusions and the second radiating-plate coupling protrusions may be inserted into and coupled to the first radiating plate-side coupling groove 52 and the second radiating plate-side coupling groove 54, respectively. This allows the radiating plate 50 to be spaced apart from and firmly supported on the base board 10 through the first feeding substrate 30 and the second feeding substrate 40.

The first feed line 320 of the first feeding substrate 30 supplies a first reference phase signal to a first point P1 on the radiating plate 50 and a first reverse phase signal to a second point P2 on the radiating plate 50.

Similarly, the second feed line 420 of the second feeding substrate 40 supplies a second reference phase signal to a third point P3 on the radiating plate 50 and a second reverse phase signal to a fourth point P4 on the radiating plate 50.

Here, the first reference phase signal and the first reverse phase signal are high-frequency signals having opposite phases to each other, and the second reference phase signal and the second reverse phase signal are also high-frequency signals having opposite phases to each other.

In the dual polarization antenna according to at least one embodiment of the present disclosure, the straight line connecting the first point P1 and the second point P2 on the radiating plate 50 and the straight line connecting the third point P3 and the fourth point P4 on the radiating plate 50 are orthogonal to each other. Namely, a polarized wave (45 polarization) may be radiated in the direction of the straight line connecting the first point P1 and the second point P2, and the other polarized wave (−45 polarization) may be radiated in the direction of the straight line connecting the third point P3 and the fourth point P4.

A distance L between the first point P1 and the second point P2 and distance L between the third point P3 and the fourth point P4 depends on the center frequency wavelength (Ac) of the frequency band used, but their distances may vary depending on the properties and materials to be targeted.

For example, distance L may vary depending on the degree of separation between cross-polarized waves or degree of inter-polarization isolation, the half-power beamwidth, and the dielectric constant of the material of the radiating plate 50.

In at least one embodiment of the present disclosure, the first point P1 and the second point P2 as well as the third point P3 and the fourth point P4 may be adjacent to the two farthest points from each other on the square radiating plate 50, for example, two vertices facing diagonally. For example, the first point P1 and the fourth point P4 of the dual polarization antenna according to at least one embodiment of the present disclosure may be respectively adjacent to four vertices of the square radiating plate 50. Thus, the dual polarization antenna according to at least one embodiment of the present disclosure can have the most compact structure corresponding to the frequency in use.

Figure 5:
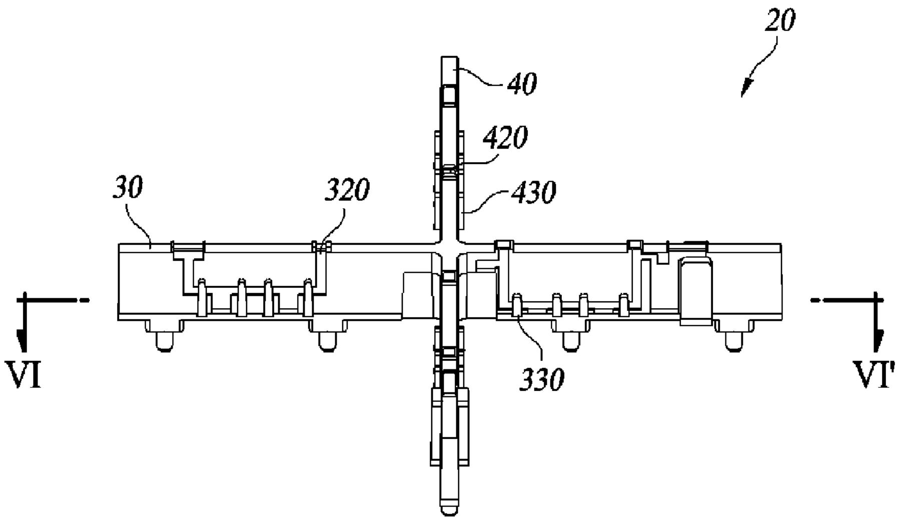
FIG. 5 is an enlarged view of a power feeding unit of the dual polarization antenna according to at least one embodiment of the present disclosure.

FIG. 5 is an enlarged view of a power feeding unit of the dual polarization antenna according to at least one embodiment of the present disclosure.

Figure 6:
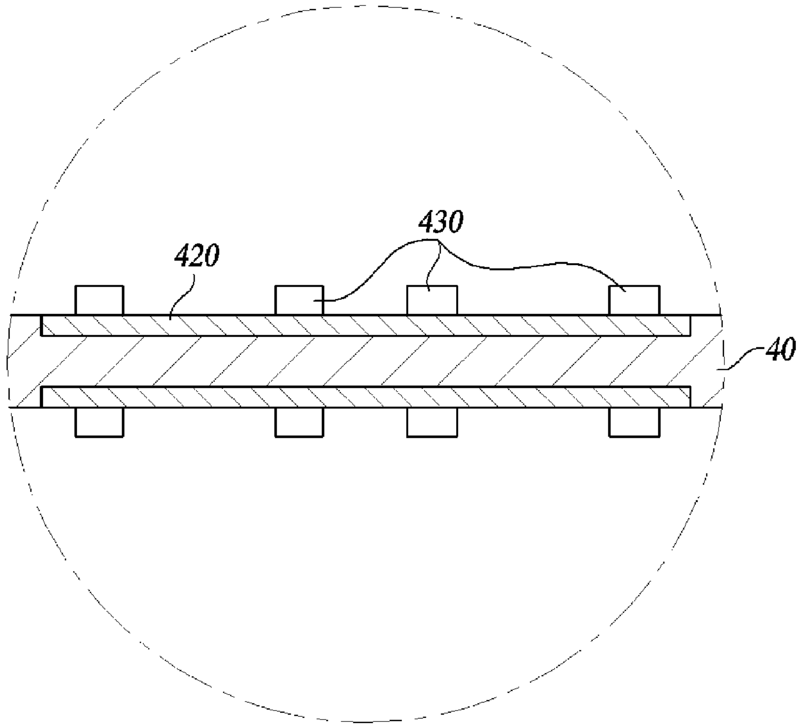
FIG. 6 is a cross-sectional view of a section taken along line VI-VI' of FIG. 5.

FIG. 6 is a cross-sectional view of a section taken along line VI-VI' of FIG. 5.

Referring to FIGS. 5 and 6, a power feeding unit 20 of the dual polarization antenna according to at least one embodiment of the present disclosure may be integrally formed by multi-component injection molding and may have the first feeding substrate 30, the second feeding substrate 40, the first feeding line 320, and the second feeding line 420.

In at least one embodiment of the present disclosure, the power feeding unit 20 composed of the first feeding substrate 30 and the second feeding substrate 40 may have an appearance of a support having a "+" or cross shape.

Additionally, the first feed line 320 and the second feed line 420 may be shaped to be partially embedded in the first feeding substrate 30 and the second feeding substrate 40, and they may be supported on the surfaces of their respective feeding substrates.

For example, the first feed line 320 and the second feed line 420 may have at least a portion of their surfaces buried in the first feeding substrate 30 and the second feeding substrate 40 so that their surfaces are buried in part with other portions being exposed to the outside. As a result, the first feed line 320 and the second feed line 420 may be rigidly supported on their respective feeding substrates without the need for additional fastening means.

Further, in at least one embodiment of the present disclosure, the first feeding substrate 30 and the second feeding substrate 40 may each include first reinforcing ribs 330 and second reinforcing ribs 430.

The first reinforcing ribs 330 and the second reinforcing ribs 430 may be stiffening support members that secure the first feed line 320 and the second feed line 420 by extending across the surfaces of the first feed line 320 and the second feed line 420, respectively.

In at least one embodiment of the present disclosure, antenna elements are used to transmit and receive signals in high frequency bands, and even very small tolerances can significantly change the frequency characteristics of the antenna.

In particular, since the feeding substrates made of plastic and the feeding lines made of metal patterns have different thermal expansion coefficients, the feeding lines may be subjected to slight birdcaging depending on the thermal deformation caused by the heat generated by the antenna in use or the thermal deformation in hot or cold conditions.

In at least one embodiment of the present disclosure, the feed lines are partially embedded in the plastic feeding substrates by multi-component injection molding, but also in some weakly supported areas, the feed lines can be rigidly supported by the first reinforcing ribs 330 and the second reinforcing ribs 430. This can ensure stable frequency characteristics and increase antenna efficiency.

Furthermore, in at least one embodiment of the present disclosure, the feeding substrates are made of a plastic material, which may be selected to have a suitable dielectric constant (insulating nature) while having a suitable weight, strength, and high heat resistance.

For example, the present disclosure may select a material other than a conventional printed circuit board material, e.g., polyimide, and as long as structural stability is ensured, it may select a material that is sufficiently light and easily processable.

Figure 7:
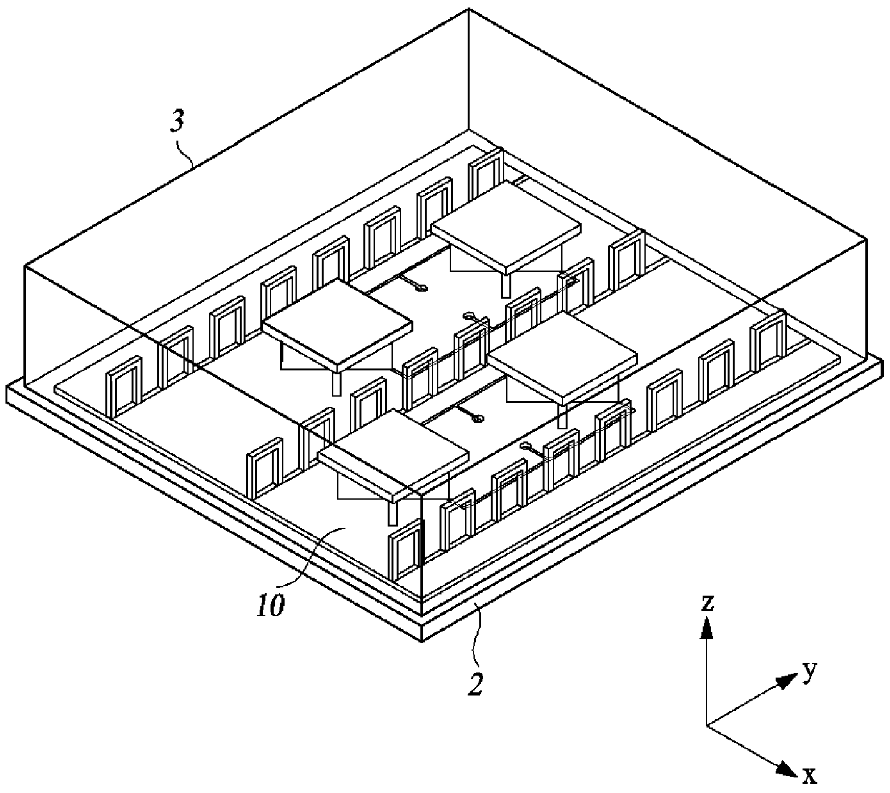
FIG. 7 is a partially see through perspective view of a dual polarization antenna assembly according to at least one embodiment of the present disclosure.

FIG. 7 is a partially see through perspective view of a dual polarization antenna assembly according to at least one embodiment of the present disclosure.

Referring to FIG. 7, a dual polarization antenna assembly according to at least one embodiment of the present disclosure includes a casing 2, one or more dual polarization antennas disposed on one side of the casing 2, and a radome 3 covering the plurality of dual polarization antennas. The casing 2 may be configured to support one or more dual polarization antennas.

In this embodiment, each of the dual polarization antennas is substantially identical to the dual polarization antenna previously described with reference to FIGS. 1 through 6, and the plurality of dual polarization antennas share a single base substrate 10.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A dual polarization antenna, comprising:

a base substrate;

a power feeding unit supported on the base substrate; and a radiating plate supported on the power feeding unit, wherein the power feeding unit comprises a first feeding substrate and a second feeding substrate arranged to cross each other on the base substrate, the first feeding substrate comprises a first feed line configured to supply a first reference phase signal to a first point on the radiating plate and to supply to a second point on the radiating plate, a first reverse phase signal having a reverse phase relative to the first reference phase signal, the second feeding substrate comprises a second feed line configured to supply a second reference phase signal to a third point on the radiating plate and to supply to a fourth point on the radiating plate, a second reverse phase signal having a reverse phase relative to the second reference phase signal, and wherein the first feeding substrate and the second feeding substrate are integrally molded as a single-piece body, wherein the first feeding substrate, the first feed line, the second feeding substrate, and the second feed line are integrally molded as a single body having a three-dimensional configuration via multi-component injection molding.

2. The dual polarization antenna of claim 1, wherein the power feeding unit has a "+" or cross shape.

3. The dual polarization antenna of claim 1, wherein the first feeding substrate comprises at least one or more first reinforcing ribs configured to secure the first feed line to the first feeding substrate.

4. The dual polarization antenna of claim 3, wherein the first reinforcing rib extends across a surface of the first feed line to secure the first feed line to the first feeding substrate.

5. The dual polarization antenna of claim 1, wherein the second feeding substrate comprises at least one or more second reinforcing ribs configured to secure the second feed line to the second feeding substrate.

6. The dual polarization antenna of claim 5, wherein the second reinforcing rib extends across a surface of the second feed line to secure the second feed line to the second feeding substrate.

7. The dual polarization antenna of claim 1, wherein the first feed line is formed to be embedded, at least in part, in the first feeding substrate.

8. The dual polarization antenna of claim 1, wherein the second feed line is formed to be embedded, at least in part, in the second feeding substrate.

9. The dual polarization antenna of claim 1, wherein the first feeding substrate and the second feeding substrate are vertically upright on the base substrate, and the first feeding substrate and the second feeding substrate have respective midsections that intersect perpendicular to each other.

10. The dual polarization antenna of claim 1, wherein the first feeding substrate is disposed parallel to a straight line connecting the first point and the second point, and the second feeding substrate is disposed parallel to a straight line connecting the third point and the fourth point.

11. The dual polarization antenna of claim 1, wherein the radiating plate is square, the first point, the second point, the third point, and the fourth point are adjacent to four vertices of the radiating plate, and the radiating plate has a diagonal length that is equal to a half wavelength of a center frequency of a frequency in use.

12. The dual polarization antenna of claim 1, wherein the first feed line is connected to a signal line of the base substrate through one solder joint, and the second feed line is connected to another signal line of the base substrate through another solder joint.

13. A dual polarization antenna assembly, comprising:

a casing;

one or more of the dual polarization antenna according to claim 1 disposed on the casing; and a radome configured to cover the one or more of the dual polarization antenna.

* * * * *